(12) United States Patent
Chemishkian et al.

(10) Patent No.: US 9,397,522 B2
(45) Date of Patent: Jul. 19, 2016

(54) METHOD AND SYSTEM TO CONTROL AMBIENT RF ENERGY FOR WIRELESS DEVICES

(75) Inventors: Sergey Chemishkian, Menlo Park, CA (US); Ken Gudan, Sunnyvale, CA (US); Jonathan J. Hull, San Carlos, CA (US); Matthew S. Reynolds, Durham, NC (US)

(73) Assignees: RICOH CO., LTD., Tokyo (JP); DUKE UNIVERSITY, Durham, NC (US)

( * ) Notice: Subject to any disclaimer, the term of this patent is extended or adjusted under 35 U.S.C. 154(b) by 1041 days.

(21) Appl. No.: 13/415,560

(22) Filed: Mar. 8, 2012

(65) Prior Publication Data

US 2013/0234536 A1  Sep. 12, 2013

(51) Int. Cl.
  *H01F 27/42*  (2006.01)
  *H01F 37/00*  (2006.01)
  *H01F 38/00*  (2006.01)
  *H02J 17/00*  (2006.01)

(52) U.S. Cl.
  CPC ..................................... *H02J 17/00* (2013.01)

(58) Field of Classification Search
  CPC ........................................................ H02J 17/00
  USPC ............................................................. 307/104
  See application file for complete search history.

(56) References Cited

U.S. PATENT DOCUMENTS

2007/0109121 A1* 5/2007 Cohen ...................... 340/539.26
2009/0058361 A1* 3/2009 John ............................ 320/128

* cited by examiner

*Primary Examiner* — Carlos Amaya
(74) *Attorney, Agent, or Firm* — Blakely, Sokoloff, Taylor & Zafman LLP (57) ABSTRACT

A method and apparatus is disclosed herein for controlling radio-frequency (RF) energy for wireless devices. In one embodiment, the method comprises determining to increase radio-frequency (RF) energy available to power a wireless tag and controlling the RF energy delivered to the wireless tag to provide tag energy, using one or more of: a) increasing transmission RF power of one or more wireless communication devices, b) increasing a duty cycle associated with wireless transmissions of one or more wireless communication devices, and c) decreasing path loss of the power to the wireless tag.

20 Claims, 6 Drawing Sheets

| Tag ID | Device | Path Loss, dB | Capabilities | | | | | Mode | Current Channel | Location |
|---|---|---|---|---|---|---|---|---|---|---|
| | | | AP | TX Power Adjustable | Beacon Interval Adjustable | Streaming Supported | Max TX Power, dBm | | | |
| Tag2 | Dev1 | 40 | ✔ | ✔ | ✔ | ✔ | 26 | B,G,N | 11 | |
| Tag2 | Dev2 | 45 | ✔ | | | ✔ | 20 | G | 11 | $X_1Y_1Z_1$ |
| Tag2 | Dev3 | 35 | ✔ | | | ✔ | 20 | N | 5 | $X_2Y_2Z_2$ |

Figure 4

Maintain a data structure that stores capabilities for a plurality of wireless communication devices and their respective path loss with respect to a wireless device (e.g., Wi-Fi node, wireless or Wi-Fi tag, etc.)

501

Determine that it wants to increase radio-frequency (RF) energy (e.g., Wi-Fi energy) available to power a wireless device (e.g., Wi-Fi node, wireless or Wi-Fi tag, etc.)

502

Access the data structure to select one or more wireless devices (e.g., Wi-Fi devices, such as access point, clients, etc.) to use to increase the energy delivered to the wireless device

503

Control the RF energy delivered to the wireless device to using one or more of: causing an increase in transmission RF power of one or more wireless communication devices; causing an increase in duty cycle associated with wireless transmissions of one or more wireless communication devices; and c) decreasing path loss of the power to the wireless device

504

Command wireless device(s) to change its RF energy output

FIG. 6

METHOD AND SYSTEM TO CONTROL AMBIENT RF ENERGY FOR WIRELESS DEVICES

FIELD OF THE INVENTION

Embodiments of the present invention relate to the field of RF energy harvesting; more particularly, embodiments of the present invention relate to directing more energy to wirelessly powered devices, such as wirelessly powered sensor tags, to control the amount of energy that can be harvested.

BACKGROUND OF THE INVENTION

Sensor networks are becoming more popular. Radio Frequency Identification (RFID) tags have been used prevalently and those that include sensing capabilities have emerged as a generally inexpensive and effective means of addressing many wireless sensor applications. Purely passive sensors, such as Computational RFID tags (CRFID), when actively interrogated by an RF transceiver/reader, receive energy via the interrogation signal to power themselves up so that they can acquire readings from their sensors. Generally, CRFID tags equipped with one or more sensors require an internal energy source, or an internal reservoir of previously stored energy, to measure and store their acquired information at times other than during active interrogation by a reader.

Next generation sensor networks may be powered by energy harvesting techniques, to avoid requiring batteries. Energy harvesting is the process by which energy is derived from external sources (e.g., solar power, thermal energy, wind energy, salinity gradients, and kinetic energy), captured and stored.

Among the various harvesting options include radio frequency energy (RF). With RF energy harvesting, wireless energy is harvested from a transmitter that is some distance away from devices with RF power harvesting capabilities. Such transmitters can include transmitters that transmit unmodulated RF energy for the specific purpose of serving as a power source, as well as other transmitters that perform a communication function.

One of the more popular forms of RF data communications used today is Wi-Fi communications. Today, most Wi-Fi transmitters and receivers operate in the 2.4 GHz or 5 GHz frequency bands and there are many local area networks that are based on Wi-Fi in which access points enable Wi-Fi clients to gain access to networks such as the Internet. Additionally, other communication standards such as Zigbee and Bluetooth operate in the 2.4 GHz frequency spectrum. Other devices emit energy primarily in the 2.4 GHz Industrial Scientific and Medical (ISM) band such as microwave ovens and medical diathermy machines.

SUMMARY OF THE INVENTION

A method and apparatus is disclosed herein for controlling radio-frequency (RF) energy for powering wireless devices. In one embodiment, the method comprises determining to increase radio-frequency (RF) energy available to power a wireless tag and controlling the RF energy delivered to the wireless tag to provide the tag energy, using one or more of: a) increasing transmission RF power of one or more wireless communication devices, b) increasing a duty cycle associated with wireless transmissions of one or more wireless communication devices, and c) decreasing path loss of the power to the wireless tag.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for controlling the energy provided to wireless devices (e.g., nodes, tags, etc.) is described. In some embodiments, the wireless devices communicate with a communication protocol called "Wi-Fi" such as the IEEE 802.11a/b/g/n communication protocols specified by the Institute of Electrical and Electronics Engineers. In some embodiments, the communication scheme called "Wi-Fi" refers to another communication protocol other than the IEEE 802.11a/b/g/n standard or successor communication protocols. In one embodiment, the wireless devices are Wi-Fi devices communicating at 2.4 GHz. In another embodiment, the wireless devices are Wi-Fi devices transmitting at 2.4 GHz and/or 5 GHz. In one embodiment, the energy is controlled by a control system. Under programmable control, the control system coordinates groups of Wi-Fi devices to increase the energy available in one or more specified locations to one or more Wi-Fi nodes, such as wireless sensor tags. This enables such nodes to be powered up to obtain an improved level of performance over that possible with an existing unmodified Wi-Fi infrastructure. The techniques described herein adapt an existing infrastructure to improve the usefulness of Wi-Fi based wireless sensor nodes with a software-based solution that requires no hardware modifications.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Wireless Sensor Tag Energy Control System

A method and system for routing RF energy from stationary and mobile wireless devices (e.g., Wi-Fi devices) to the wireless sensor devices (e.g., Wi-Fi nodes, wireless sensor tags, etc.) are described. It should be noted that references to Wi-Fi communications and networks in the embodiments below should not be considered as limiting the scope of the present invention. Embodiments of the present invention are applicable to RF communication protocols and standards other than Wi-Fi.

Figure 1:
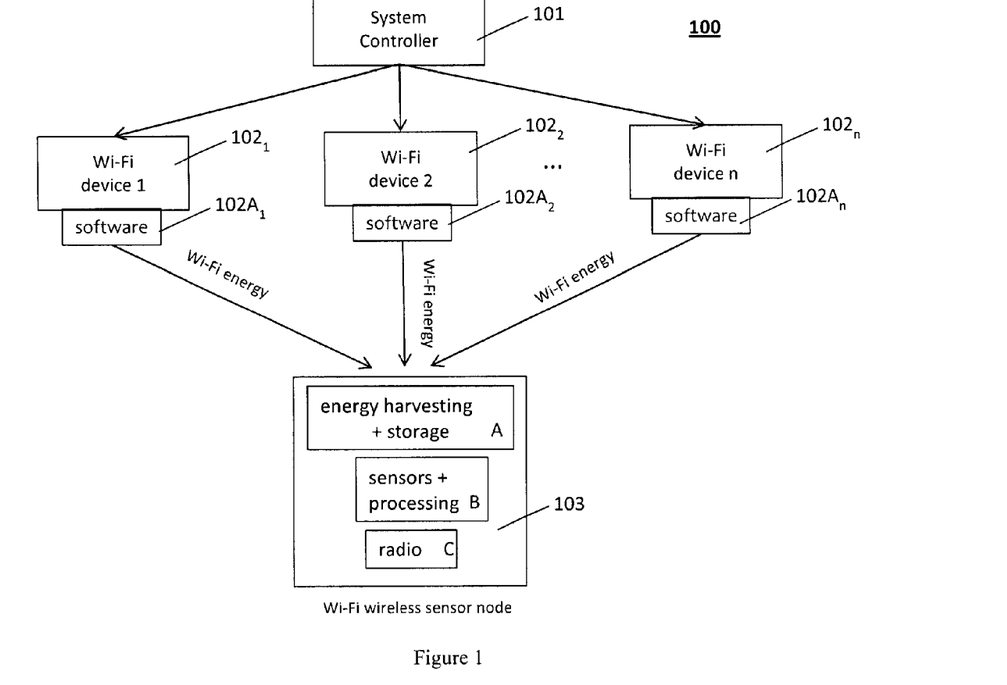
FIG. 1 is one embodiment of a Wi-Fi wireless sensor network energy control system.

FIG. 1 is one embodiment of a Wi-Fi energy control system. The control system includes Wi-Fi sensor nodes that receive and harvest Wi-Fi energy, perform some sensing and calculation, and communicate results with the Wi-Fi infrastructure. In one embodiment, the complexity of the sensing, calculation and communication they can perform is determined by the amount of energy they receive.

Referring to FIG. 1, system 100 includes a system controller 101 that is communicably coupled with Wi-Fi devices $102_{1-n}$. Wi-Fi devices $102_{1-n}$ can comprise access points, computers (e.g., laptop computers, desktop computers, etc.), soft APs, smartphones, clock radios, TVs, thermostats, wall switches, alarm sensors, glass break sensors, smoke alarms, carbon monoxide sensors, asset tracking tags, active RFID tags in the Wi-Fi frequency band, devices in a personal area network that use Wi-Fi such as watches, heart rate monitors, and athletic or health monitors. Note that while multiple Wi-Fi devices are shown, the techniques described herein may only require one Wi-Fi device to be present.

System 100 also includes Wi-Fi sensor node 103. In one embodiment, Wi-Fi sensor node 103 comprises a Wi-Fi sensor node tag. A Wi-Fi sensor node tag is an intelligent sensor connected to a network (e.g., Internet). Wi-Fi sensor node 103 harvests and accumulates energy using energy harvesting and storage module 103A from transmissions (e.g., un-modulated transmissions or transmissions modulated with information to be communicated) in the Wi-Fi band from one or more of Wi-Fi devices $102_{1-n}$ For those skilled in the art, there are numerous power management components available that can be used to receive the harvested energy from the antenna and store it in a rechargeable battery, a supercapacitor, or another energy storage reservoir until needed. Example suppliers of power management components are Maxim, Linear Technology, and Texas Instruments.

Periodically, Wi-Fi wireless sensor node 103 executes a sensing task using sensor/processing module 103B. In one embodiment, sensor/processing module 103B may sense temperature, pressure, humidity, gas composition, images, position, or another environmental condition.

Wi-Fi wireless sensor node 103 includes communication interface 103C to wirelessly communicate data (e.g., sensed data) to another Wi-Fi device, such as one or more of Wi-Fi devices $102_{1-n}$. In one embodiment, the Wi-Fi wireless sensor node 103 transmits information in an unreliable datagram protocol (UDP) packet. In another embodiment, the Wi-Fi wireless sensor node transmits information in a transmission control protocol (TCP) packet, a hypertext transfer protocol stream (HTTP), or another digital data format.

System controller 101 controls Wi-Fi devices $102_{1-n}$ in order to increase the Wi-Fi energy they transmit to Wi-Fi wireless sensor node 103. In one embodiment, each of Wi-Fi devices $102_{1-n}$ include software $102A_{1-n}$ that is responsive to communications from system controller 101 to change their energy output.

In one embodiment, system controller 101 comprises a memory and a processor coupled to the memory and operable to determine to increase Wi-Fi (i.e., radio-frequency (RF)) energy available to power Wi-Fi wireless sensor node 103 (e.g., a wireless tag) and control the Wi-Fi energy delivered to the Wi-Fi wireless sensor node 103. System controller 101 controls the Wi-Fi energy delivered to Wi-Fi wireless sensor node 103 using transmission parameters consisting of one or more of: a) increasing transmission Wi-Fi power of one or more wireless communication devices, such as Wi-Fi devices $102_{1-n}$; b) increasing a duty cycle associated with wireless transmissions of one or more wireless communication devices, such as Wi-Fi devices $102_{1-n}$, c) decreasing path loss of the power to the Wi-Fi wireless sensor node 103 (e.g., a wireless tag), d) varying the frequency or channel of operation, e) varying the power spectral density (PSD) of the transmitted signal, f) transmitting on a particular antenna from among a plurality of antennas. In one embodiment, the system controller 101 controls the Wi-Fi energy by performing two or more of a)-f). In one embodiment, the system controller sends commands to, or otherwise signals, the wireless communication device to adjust its transmit parameters.

In one embodiment, the system controller increases RF energy to the wireless sensor node by signaling the one or more wireless communication devices (e.g., Wi-Fi devices $102_{1-n}$) to increase their own transmit output power. The signaling may be in the form of commands sent by the system controller to cause the wireless communication device to change its transmission parameters. In another embodiment, the system controller increases the RF energy to the wireless sensor node by increasing the duty cycle or by increasing the frequency of beacon pulses output for at least one of the one or more wireless communication devices (e.g., Wi-Fi devices $102_{1-n}$). In still another embodiment, the system controller reduces path loss by selecting the one or more wireless communication devices (e.g., Wi-Fi devices $102_{1-n}$) for an increase in transmission Wi-Fi power and/or an increase in the duty cycle associated with their wireless transmissions based on their proximity to the Wi-Fi wireless sensor node 103 (e.g., a wireless tag).

The RF energy delivered to a Wi-Fi wireless sensor tag over time window T is given by:

$$P_{Average\ RX\ Tag}(t) = \frac{1}{T}\int_{t}^{t+T} \frac{P_{TX\_AP}(t)}{K_{path\ loss}(t)} dt$$

In one embodiment, the processor of system controller 101 controls the Wi-Fi energy to maximize average power over time T at the wireless tag according to:

$$P_{Average\ RX\ Tag} = \frac{1}{T}\sum_{1\leq j\leq M} T_j\left[\sum_{1\leq i\leq N} \frac{P_{peak\_TX}(i,j)K_{duty\ cycle}(i,j)}{K_{path\ loss}(i,j)}\right]$$

where time is $T=\Sigma_{1\leq j\leq M}T_j$, and (i,j)-dependent components are for a particular configuration of a participating RF-emitting device i at time interval $T_j$. This configuration may include antenna configuration, orientation, and location (for mobile devices), RF modulation, transmitted frequency, and other parameters affecting peak transmitted power, duty cycle, and path loss. As shown above, the average power is a function of harvesting time, the transmitted power (which is a function of the raw power and duty cycle), and the path loss. In one embodiment, this average is dynamically updated over time. By programmatically computing and using the path loss, controller 101 is able to increase the raw power and the duty cycle to control energy emitted by communication devices (e.g., Wi-Fi devices $102_{1-n}$) in the system.

Figure 6:
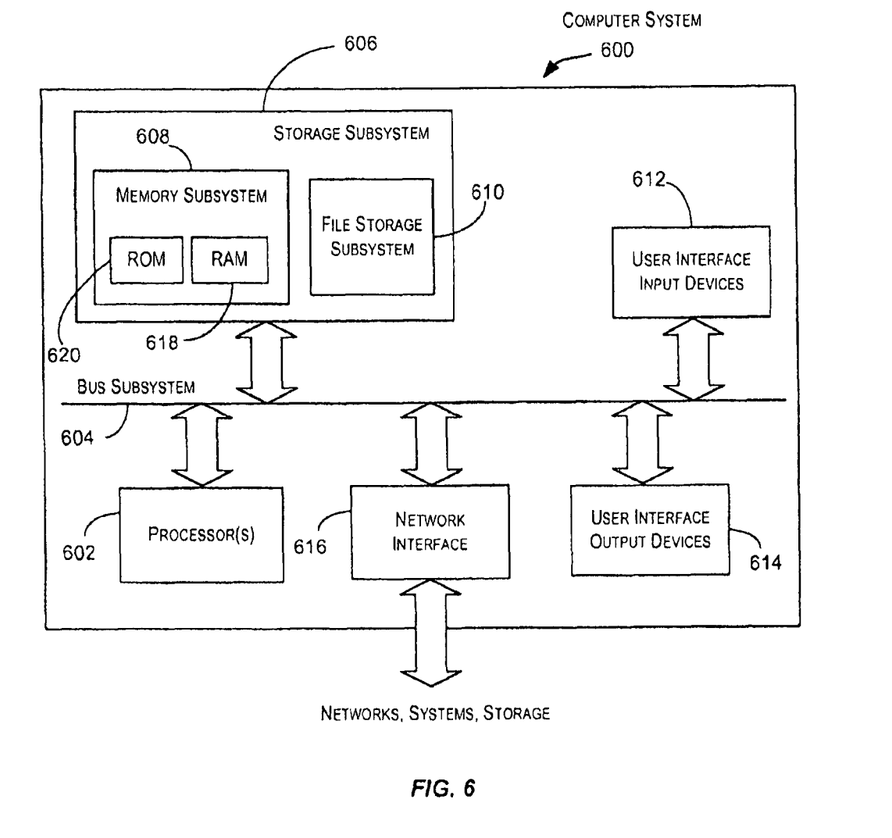
FIG. 6 is a block diagram of a computer system that may be used to practice an embodiment of the present invention.

One embodiment of the system controller is shown in FIG. 6 and is described in more detail below.

Increasing Raw Transmitted Power

In one embodiment, the transmit power of the Wi-Fi devices may be controlled by the system controller. In one embodiment, the transmit power is controlled via an Application Programming Interface (API). In such a case, the system controller makes a call to the device with a request to boost its transmit power. In one embodiment, the request sets the transmit power amount. In another embodiment, the request specifies an amount by which the transmit power is to increase. In still another embodiment, the request includes data that is indicative of amount of increase in the transmit power (e.g., a percentage by which to increase, etc.) The amount that the transmit power may be adjusted is dependent on the hardware, firmware, and software. In one embodiment in which the Wi-Fi device is an access point, the transmit power may be adjusted from 1 mW through 500 mW, in 1 dB increments. Once the communication with the Wi-Fi device is complete and the desired effect on the emitted energy has been achieved, the system controller may optionally command the Wi-Fi device to change its RF energy output, perhaps to the original level. Of course, energy emissions may be controlled so that regulatory requirements are met, as required. In some embodiments, the system controller controls the transmission parameters so that particular regulatory requirements are met by individual wireless devices (e.g., Wi-Fi devices $102_{1-n}$) as if they were operating in isolation from each other. In other embodiments, the system controller controls the transmission parameters so that particular regulatory requirements are met by two or more wireless devices (e.g., Wi-Fi devices $102_{1-n}$) considered as a group.

Increasing the Duty Cycle

Figure 2A:
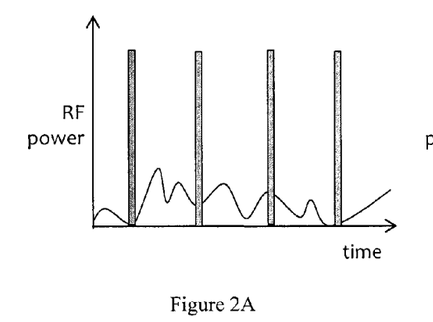
FIG. 2A illustrates a beacon pattern of a typical Wi-Fi access point.
Figure 2B:
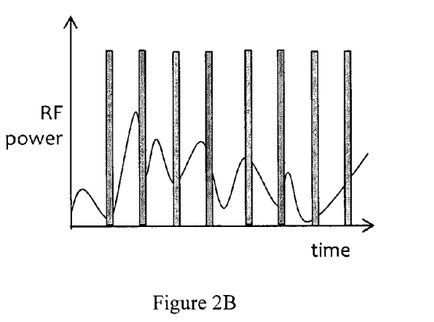
FIG. 2B illustrates a modified (increased) beacon pattern of a Wi-Fi access point of the system described herein.

In one embodiment, the duty cycle by which a Wi-Fi device is transmitting is adjusted to increase the amount of energy available to the Wi-Fi wireless sensor node. In one embodiment, the duty cycle is increased by increasing the transmission frequency of beacon pulses. This increases the amount of energy delivered to a Wi-Fi wireless sensor node (e.g., a wireless tag). FIG. 2A illustrates a beacon pattern of a typical Wi-Fi access point. The thin square bars indicate the transmitted beacon pulse. The thin curvy line indicates the harvestable energy available from those pulses. FIG. 2B illustrates a modified (increased) beacon pattern of a Wi-Fi access point of the system described herein. Notice that the amount of harvestable RF energy increases when a higher duty cycle of beacon pulses are presented.

In another embodiment, the frequency of PROBE messages on Wi-Fi clients is increased. In another embodiment, the frequency of messages that are intended to control the operation of the network, rather than to carry application data payloads, are increased.

In yet another embodiment, an increase in network traffic in general creates an increase in the duty cycle. For example, in one embodiment, the system controller causes one or more Wi-Fi devices near the Wi-Fi wireless sensor node (e.g., tag) to stream data. This could be accomplished by having the Wi-Fi device (e.g., an access point) stream the data (e.g., a video) to a Wi-Fi client near the Wi-Fi wireless sensor node. Alternatively, if there is no Wi-Fi client in the vicinity, the Wi-Fi device could streaming the data to a dummy address or a previously used address (even though the Wi-Fi client is no longer there) because the Wi-Fi wireless sensor node would still receive the energy from such communications. Note that in one embodiment, when performing such streaming, the data may be communicated on less than all the antennas of the transmitting device. For example, in the case of a Wi-Fi access point streaming the data, the access point may only transmit on one or only a subset of its available antennas. The selection of antennas may be made based on which antenna or combination of antennas would result in the most energy being delivered to the Wi-Fi wireless sensor node. In one embodiment, the determination of which antenna(s) to use may be based on the path loss between each antenna on the device and the Wi-Fi wireless sensor node. In such a case, such information is made available to the controlling device (e.g., the system controller in a centralized control system, and/or the streaming Wi-Fi device in a distributed control system where the Wi-Fi device determines which Wi-Fi wireless sensor node to provide power to). This information may be stored in the tables that are discussed in more detail below.

In a further embodiment, the system controller causes an increase in the duty cycle by causing a change in the Wi-Fi modulation. For example, the system controller causes the Wi-Fi modulation to change from the current OFDM to another IEEE 802.11 modulation format (e.g., PH, DSSS). For Wi-Fi devices that expose the capability to change the modulation scheme programmatically, the system controller sends a software command to the device instructing it to do so. In some embodiments, the modulation scheme is changed in terms of data rate, signal constellation, symbol rate, bit rate, or by selectively switching among amplitude shift keying, phase shift keying, or quadrature amplitude modulation (QAM)

In one embodiment, the system controller could cause the Wi-Fi devices to send short bursts of an un-modulated or continuous wave (CW) signal at a particular Wi-Fi carrier frequency at full power. For Wi-Fi devices that expose the capability to transmit short bursts of CW programmatically, the system controller sends a software command to the device instructing it to do so. Recently developed Wi-Fi chipsets and devices such as the Intel 5300 and the Qualcomm Atheros AR9280 expose a plethora of capabilities like this.

Decreasing Path Loss

In one embodiment, the system controller increases the amount of energy delivered to Wi-Fi wireless sensor nodes (e.g., tags) by selecting Wi-Fi devices based on path loss information. For example, the system controller selects one or more Wi-Fi devices that have lower path loss to a particular Wi-Fi sensor node when selecting which Wi-Fi devices to increase transmit power and/or duty cycle. That is, in one embodiment, the system controller increases the duty cycle of one or more Wi-Fi devices that are most efficient at energizing Wi-Fi nodes (e.g., a tag or tags) that are desired to be powered up. In this way, the amount of energy delivered to the Wi-Fi node can be increased. In one embodiment, in order to reduce the effects of path loss, the system controller uses the Wi-Fi devices or devices closest to provide increased energy to the Wi-Fi node(s) that is to be powered. The purpose of selecting only those Wi-Fi devices near by the sensor nodes that are to be powered up is to make a more efficient sensor network. Once the communication with the Wi-Fi device is complete and the desired effect on the emitted energy has been achieved, the system controller may optionally command the Wi-Fi device to change its RF energy output, perhaps to an original level.

In one embodiment, the path loss between each Wi-Fi device and each Wi-Fi wireless sensor node used with the techniques described herein is an estimate of the path loss. In one embodiment, the path loss can be estimated by a Wi-Fi device that sends a Query command with a known power. Nodes respond to the query with their ID and an indication of the power level they received. The difference between transmitted power and received power is easily computed by the Wi-Fi device, and provides the path loss.

Figure 3A:
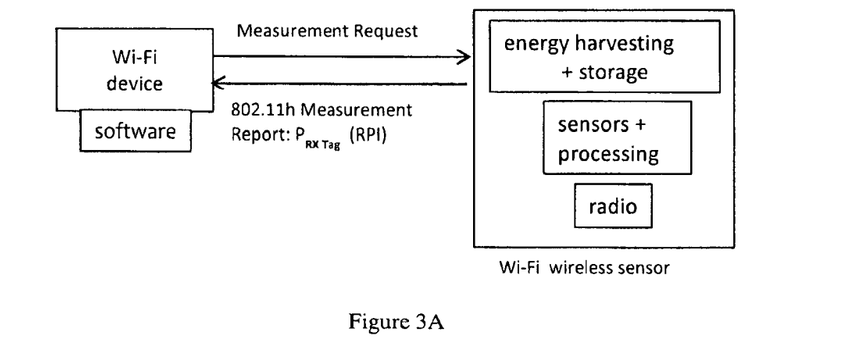
FIGS. 3A to 3D illustrate four cases where the path loss is modeled when the Wi-Fi node is a wireless sensor node tag.

FIGS. 3A-3D illustrate four cases where the path loss is modeled between a Wi-Fi device and a Wi-Fi wireless sensor tag. Referring to FIG. 3A, Case 1 is shown in which the path loss is given as follows:

$$K_{path\ loss} = P_{TX\ Device}/P_{RX\ Tag}$$

Figure 3B:
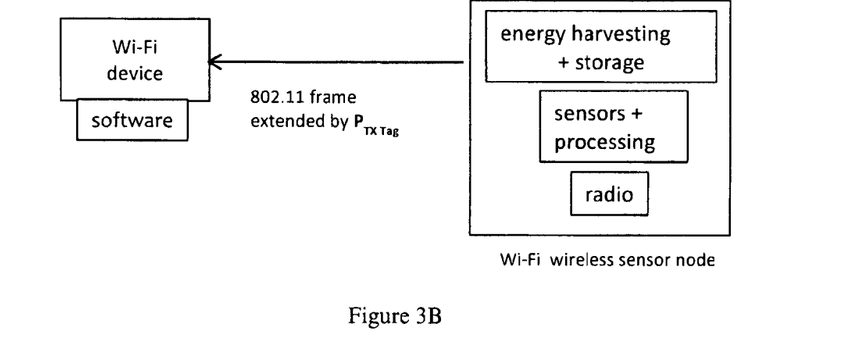

In FIG. 3B, Case 2 is shown in which the path loss is given as follows:

$$K_{path\ loss} = P_{TX\ Tag}/P_{RX\ Device}$$

Figure 3C:
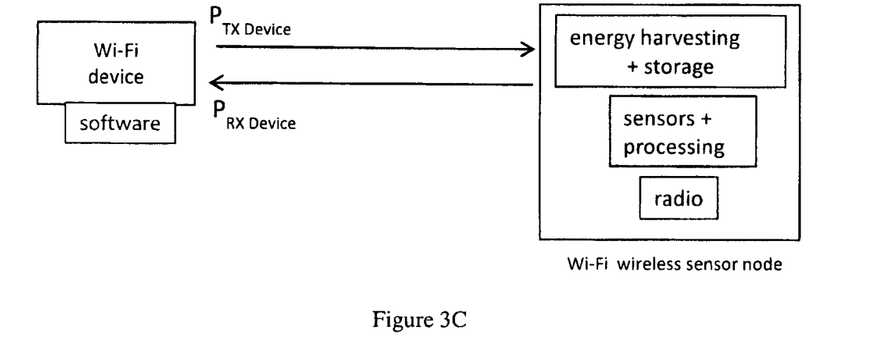

In FIG. 3C (backscatter communications is performed between the Wi-Fi device and the Wi-Fi sensor node) Case 3 is shown in which the path loss is given as follows:

$$K_{path\ loss} = \sqrt{\frac{K_{backscatter\ efficiency} P_{TX\ Device}}{P_{RX\ Device}}}$$

Figure 3D:
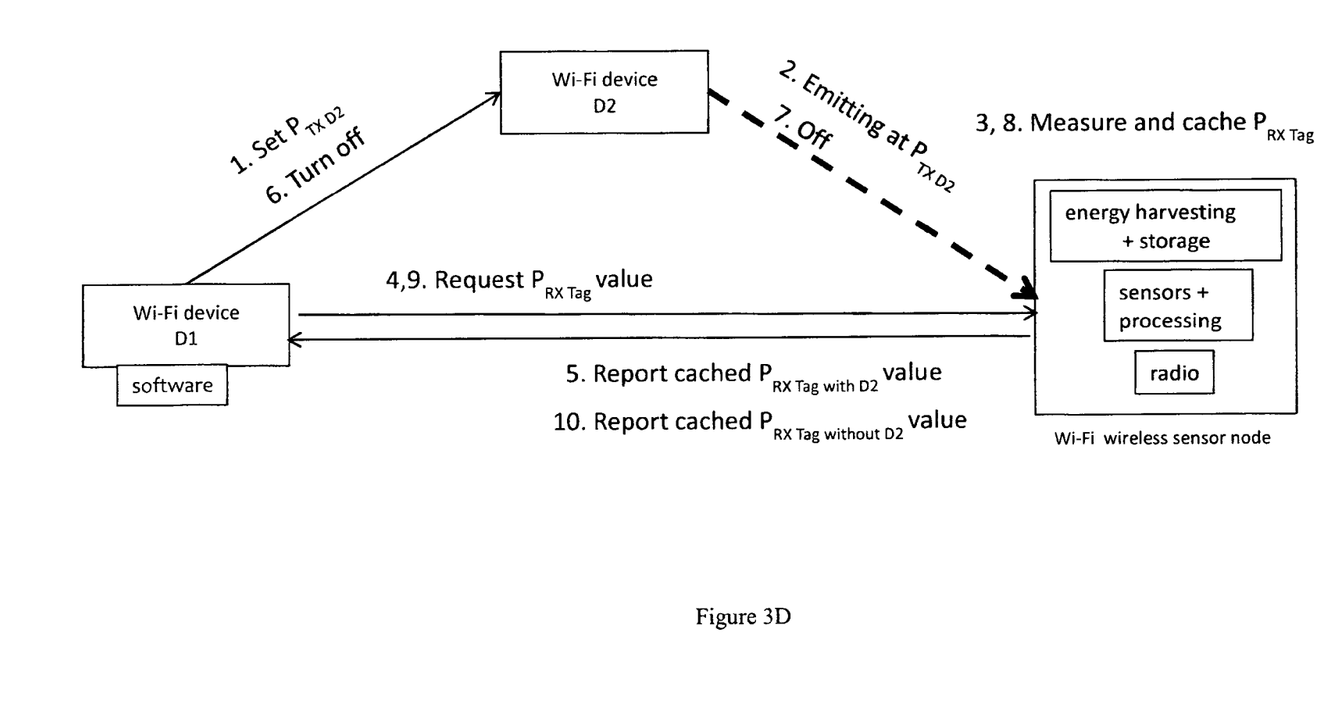

In FIG. 3D, Case 4 is shown, when a Wi-Fi device D1 measures path loss between a Wi-Fi device D2 and a tag by orchestrating operation of the device D2 and measurements by the tag, where the tag can be communicating with device D1 either by active transmission, or by backscatter. At step 1, Wi-Fi device D1 sends a command to Wi-Fi device D2 instructing it to set its transmit power to $P_{TX\ D2}$. At step 2, device D2 emits power $P_{TX\ D2}$. At step 3, the wireless sensor node measures and caches $P_{RX\ Tag}$. At step 4, device D1 sends a command to the wireless sensor node requesting the most recently cached value of $P_{RX\ Tag}$. At step 5, the wireless sensor node reports the most recently cached value of $P_{RX\ Tag}$. At step 6, device D1 sends a command to device D2 instructing it to turn off its transmitter. At step 7, a command is transmitted to the wireless sensor node instructing it to expect D2 to power down shortly. After some interval sufficient for D2 to actually power down, step 8 is executed and the wireless sensor node measures and caches $P_{RX\ Tag}$. This effectively is the background energy received by the node when D2 is off. At step 9, D1 instructs the wireless sensor node to report the most recently cached value of $P_{RX\ Tag}$. At step 10, that value is returned. At step 11 of the process the path loss is computed as follows:

$$K_{path\ loss} = \frac{P_{TX\ D2}}{P_{RX\ Tag\ with\ D2} - P_{RX\ Tag\ without\ D2}}$$

In one embodiment, the Received Channel Power Indicator (RCPI) as defined by IEEE 802.11k, which is a functional measurement covering the entire received frame with defined absolute levels of accuracy and resolution, is used to represent the received power. In another embodiment, the Received Power Indicator (RPI) histogram as defined in IEEE 802.11h is used as an indication of the received power In one embodiment, path loss tables are stored locally by a Wi-Fi device. In one embodiment, the system controller receives dynamically updated estimates of RF path loss between Wi-Fi devices (e.g., APs, stations, etc.) and wireless nodes, such as Wi-Fi wireless sensor nodes (e.g., tags).

Constructing Optimization-Supporting Data

In one embodiment, the system controller maintains information that allows it to perform its control operation. This is referred to as a centralized model of control. To obtain this information, the system controller broadcasts a network query to all Wi-Fi devices requesting information about all the wireless nodes (e.g., tags) of which each Wi-Fi device is aware. In one embodiment, the query (or queries) are for RF path loss information and Wi-Fi device capabilities.

Figure 4:
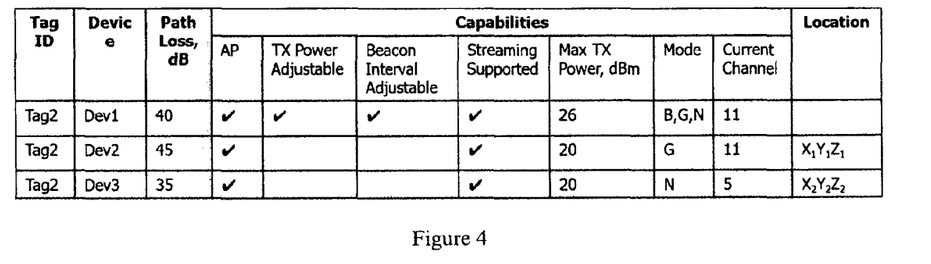
FIG. 4 illustrates an example of an RF energy routing table.

Using the information that is received, the system controller creates and maintains a table containing information about each tag and its relationship with respect to each Wi-Fi device. FIG. 4 illustrates an example of an RF energy routing table (ERT). Referring to FIG. 4, a row exists to associate tag with a particular Wi-Fi device, and specifies the path loss between the two. In one embodiment, each row also specifies the capabilities of the Wi-Fi device that are available to be utilized to increase the energy to tags. The capabilities are a set of device characteristics. In one embodiment, each row also specifies the capabilities of the Wi-Fi node (e.g., tag). To obtain this information, the system controller queries each of the Wi-Fi devices.

Thus, in a centralized model of control, a network-wide ERT is stored in a memory of, or accessible by, an ERT server. An advantage of this approach is that the code and data (query results) for the system exists in one place. Also, a centralized system controller (e.g., server) can receive commands from a node that transmits infrequently that indicate it has something important to send and the system controller should boost the power for that node so it can send that important message. In this way, the node can request assistance from network resources to improve its performance. The node doesn't need to know anything about those resources, it merely transmits a call for help. The system controller can respond by increasing power from the Wi-Fi transmitters under its control. If that still doesn't provide enough power, the system controller sends an instruction to an operator with an approximate location and an instruction to visit that area with the appropriate portable device that can provide sufficient power so that they can download the data from the node.

In one embodiment, Wi-Fi devices (e.g., access points, stations, etc.) maintain local copies of RF energy routing tables with (e.g., tag id, path loss) tuples, optionally with location-based metadata for mobile devices. In one embodiment, using a distributed model of control, Wi-Fi devices are equipped with RF Energy Routing Tables (ERT) that list the wireless sensor nodes they can see and the path loss to those nodes. In one embodiment, the ERTs are built during a discovery phase in which the output power of the Wi-Fi device is increased to its maximum and a command is transmitted that instructs the node to respond with the path loss it observes. This is analogous to the query command in the EPC Gen 2 RFID MAC protocol except that in addition to returning an identifier, the tag returns the path loss.

In one embodiment, a Wi-Fi device that wants to power-up a Wi-Fi wireless sensor node broadcasts a message (e.g., an IP message) to the Wi-Fi devices on a LAN that identifies the node and asks the Wi-Fi devices that have information about that node in their ERTs to return it. In one embodiment, this includes <Node ID>, <Path Loss, db>, <Capabilities: {AP, Station or both}, {min, max, delta TX power dBm} {min/max TX duty cycle}, e.g. ability to increase BEACON frequency, <Expiration time, sec>. The expiration time entry primarily applies to mobile devices that are moving, but also to any devices with a known schedule of operation. All devices try to estimate how long their response will be valid, based on the motion rate, operation schedule, etc. The Wi-Fi device aggregates information from the ERTs it receives and determines the power transmission strategy that the Wi-Fi devices should execute. The appropriate commands are transmitted to the Wi-Fi devices and they execute it. The sensor nodes then function accordingly with the increased RF energy in their proximity.

An Example of a Flow Diagram of One Control Process

Figure 5:
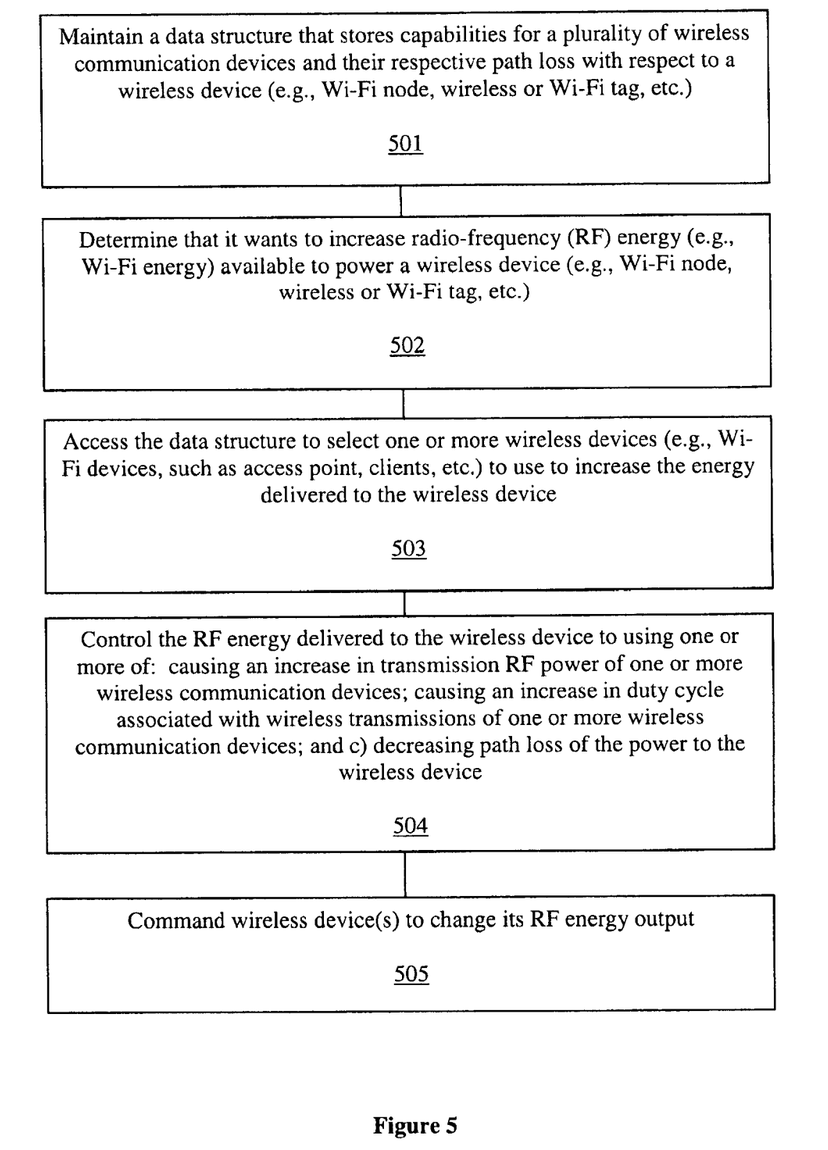
FIG. 5 is a flow diagram of one embodiment of a process for controlling the energy delivered to a Wi-Fi node.

FIG. 5 is a flow diagram of one embodiment of a process for controlling the energy delivered to a Wi-Fi node. The process is performed by processing logic that may comprise hardware (circuitry, dedicated logic, etc.), software (such as is run on a general purpose computer system or a dedicated machine), or a combination of both. In one embodiment, the process is performed by system controller 101 of FIG. 1.

Referring to FIG. 5, the process begins by processing logic maintaining a data structure that stores capabilities for a plurality of wireless communication devices and their respective path loss with respect to a wireless device (e.g., Wi-Fi node, wireless or Wi-Fi tag, etc.) (processing block 501).

Subsequently, processing logic determines that system controller 101 wants to increase radio-frequency (RF) energy (e.g., Wi-Fi energy) available to power a wireless device (e.g., Wi-Fi node, wireless or Wi-Fi tag, etc.) (processing block 502). This determination can be defined by (but not limited to) either: a regularly pre-defined polling interval, an external stimulus to the system indicating the need to communicate with the node (external interrupt), an inquiry from the node itself, or even a diagnostic/maintenance/configuration procedure requirement for the network sensing system. In response thereto, processing logic accesses the data structure to select one or more wireless devices (e.g., Wi-Fi devices, such as access point, clients, etc.) to use to increase the energy delivered to the wireless device (processing block 503).

After selection, processing logic controls the RF energy delivered to the wireless device to using one or more of: a) causing an increase in transmission RF power of one or more wireless communication devices; b) causing an increase in duty cycle associated with wireless transmissions of one or more wireless communication devices; and c) decreasing path loss of the power to the wireless device (processing block 504). In one embodiment, controlling the RF energy is performed by increasing transmission RF power of one or more wireless devices, increasing a duty cycle associated with wireless transmissions of one or more wireless devices, and decreasing path loss of the power to the wireless device. In one embodiment, controlling the RF energy is performed to maximize average power over time T at the wireless tag according to:

$$P_{Average\ RX\ Tag} = \frac{1}{T}\sum_{1\le j\le M} T_j \left[\sum_{1\le i\le N} \frac{P_{peak\ TX}(i,j) K_{duty\ cycle}(i,j)}{K_{path\ loss}(i,j)}\right]$$

where time is $T=\Sigma_{1\le j\le M} T_j$, and $(i,j)$-dependent components are for a particular configuration of a participating RF-emitting device $i$ at time interval $T_j$. This configuration may include antenna configuration, orientation, and location (for mobile devices), RF modulation, and other parameters affecting peak transmitted power, duty cycle, and path loss.

In one embodiment, increasing transmitted power comprises signaling the one or more wireless communication devices (e.g., a Wi-Fi access point proximate to the wireless sensor device) to increase its transmit power. In one embodiment, increasing the duty cycle comprises increasing the frequency of a periodic beacon pulse output for at least one of the one or more wireless communication devices (e.g., a Wi-Fi access point proximate to the wireless device). In one embodiment, increasing the duty cycle comprises changing RF modulations or communication parameters of a transmission by at least one of the one or more wireless communication devices. In one embodiment, reducing path loss comprises selecting the one or more wireless communication devices for an increase in transmission RF power and/or an increase in the duty cycle associated with their wireless transmissions based on their proximity to the wireless device. In such a case, the proximity is based in terms of path loss and RF power.

In one embodiment, after communication with the wireless device is complete, the system controller optionally commands the Wi-Fi device to change its RF energy output (processing block 505). For example, the system controller may optionally decide to restore the RF energy output to original levels when communications are complete.

Note that in the discussion above, the control is discussed in terms of controller devices that cause an increase in the energy emitted by a Wi-Fi device. However, in one embodiment, devices (e.g., emitters) other than Wi-Fi devices (e.g., Bluetooth devices, Zigbee devices, etc.) may be controlled to deliver energy to the Wi-Fi device. These devices may be parts of networks not necessarily compatible with Wi-Fi, but still using the same radio frequencies as Wi-Fi. Examples include wireless sensor networks, Zigbee networks, other devices that use the 805.15.4 physical layer, networks of Bluetooth devices, and personal area networks (PANs) composed of devices that emit RF in the 2.4 GHz band. In some embodiments, the devices may transmit using frequencies that are not part of the exact same frequency band as the Wi-Fi device, but they are similar to the operating frequency of the Wi-Fi device. PANs are typically used to communicate between devices worn by users for medical monitoring or personal interfaces such as watches (e.g., the WIMM device http://www.wimm.com) that interface with body-worn wireless devices (e.g., heart rate monitor, shoe-based accelerometer, video camera attached to the user's glasses, blood oxygen sensor, motion sensor, tilt sensor, blood glucose sensor, etc.). The devices in the PAN can be instructed to increase their wireless transmission power in much the same way as previously described when it is determined that there is a wireless sensor node nearby that should receive more RF energy. Other devices that emit energy in the 2.4 GHz band could also be equipped with the necessary hardware and software interfaces so their RF output could be controlled with software. Because the 2.4 GHz band is unlicensed, there are many devices that use it and potentially any device that uses it could be part of an ambient RF energy control system. Examples include microwave ovens, baby monitors, cordless phones, wireless keyboards, wireless computer mice, garage door openers, radar devices, and military equipment. Special purpose-built 2.4 GHz emitters can be constructed with software defined radio (SDR) systems that run software on general purpose processors and interface with hardware transmitters and receivers. An example supplier of the software is gnuradio.org and an example supplier of the hardware is Ettus Research http://ettus.com.

Ideally, such devices generate RF in the Wi-Fi frequency range because the harvesting efficiency of the Wi-Fi sensor node is likely to be greatest at this frequency, but exactly matching the Wi-Fi frequency is not required.

Embodiments of the present invention discussed above are described in terms of control energy emissions in the 2.4 GHz ISM frequency band within which Wi-Fi devices operate. However, the present invention is not limited to use or operation in the 2.4 GHz frequency band. The techniques of controlling energy emissions to provide power to devices that harvest that energy apply to harvesting RF emissions in other frequency ranges, such as, for example, the 5 GHz band that is part of the 802.11n standard, television broadcasts, AM and FM radio transmissions, ultralow frequency (ULF) radio transmissions, etc.

Energy is harvested by nodes that may or may not communicate with Wi-Fi. That is, there is no requirement that the devices harvest energy in the same frequency band in which they communicate. Also, nodes could communicate by some other means (e.g., flashing an LED). Some nodes may not communicate at all.

An Example of a Computer System

FIG. 6 is a block diagram of a computer system 600 that may be used to practice an embodiment of the present invention. In one embodiment, computer system 600 may be used to implement system controller 101 illustrated in FIG. 1 and described above. As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for enabling the various components and subsystems of computer system 600 to communicate with each other as intended. Although bus subsystem 604 is shown schematically as a single bus, alternative embodiments of the bus subsystem may utilize multiple busses.

Network interface subsystem 616 provides an interface to other computer systems, networks, and storage. Network interface subsystem 616 serves as an interface for receiving data from and transmitting data to other systems from computer system 600. For example, network interface subsystem 616 of system controller 101 may enable it to communicate with other systems via a communication network such as the Internet.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable storage medium for storing the basic programming and data constructs that provide the functionality of the present invention. Software (programs, code modules, instructions) that when executed by a processor provide the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a phone, a portable computer, a workstation, a network computer, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The teachings described above may be applied to any system comprising a processor that can be booted or rebooted. For example, while embodiments have been described above using certain systems as examples, this is not intended to be restrictive. The teachings described above and recited in the claims may also be practiced by other computing systems.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method to control energy that is available for wireless power harvesting, the method comprising:
   determining to increase radio-frequency (RF) energy available to power a wireless tag incorporating wireless power harvesting; and
   controlling the RF energy delivered to the wireless tag to provide tag energy by:
      increasing a duty cycle associated with wireless transmissions of one or more wireless communication devices by increasing network traffic of the one or more wireless communication devices.

2. The method defined in claim 1 wherein controlling the RF energy is performed further by decreasing path loss of the power to the wireless tag.

3. The method defined in claim 2 wherein controlling the RF energy is performed to maximize average power over time T at the wireless tag according to:

$$P_{Average\ RX\ Tag} = \frac{1}{T} \sum_{1 \leq j \leq M} T_j \left[ \sum_{1 \leq i \leq N} \frac{P_{peak\ TX}(i, j) K_{duty\ cycle}(i, j)}{K_{path\ loss}(i, j)} \right]$$

where time is $T = \Sigma_{1 \leq j \leq M} T_j$, and (i,j)-dependent components are for a particular configuration of a participating RF-emitting device i at time interval $T_j$.

4. The method defined in claim 2, wherein decreasing path loss of the power to the wireless tag comprises selecting wireless communication devices that have lower path loss or dynamically updating the path loss estimate information between each wireless communication device and the wireless tag.

5. The method defined in claim 1 wherein controlling the RF energy is performed further by increasing transmitted power by one or more of (i) increasing transmission RF power of one or more wireless devices or (ii) signaling the one or more wireless communication devices to increase its transmit power.

6. The method defined in claim 1 wherein increasing the duty cycle is performed further by increasing frequency of beacon, Probe, or other periodic pulse/packet output for at least one of the one or more wireless communication devices.

7. The method defined in claim 1 wherein increasing the duty cycle is performed further by changing RF modulations of a transmission by at least one of the one or more wireless communication devices.

8. The method defined in claim 1 further comprising:
   maintaining a data structure that stores capabilities for a plurality of wireless communication devices and their respective path loss with respect to providing energy to the wireless tag; and
   accessing the data structure in response to determining to increase the RF energy available to power the wireless tag to determine which available wireless communication device(s) to control to increase the RF energy delivered to the wireless tag.

9. The method defined in claim 1 further comprising controlling one or more devices not compatible with Wi-Fi to increase their emissions of RF energy.

10. The method defined in claim 1, wherein increasing network traffic of the one or more wireless communication devices comprises causing the one or more wireless communication devices to stream data.

11. The method defined in claim 10, wherein causing the one or more wireless communication devices to stream data comprises selecting and transmitting data on a subset of antennas of the one or more wireless communication devices to increase the energy being delivered to the wireless tag.

12. The method defined in claim 10, wherein causing the one or more wireless communication devices to stream data comprises selecting and transmitting data on a subset of antennas of the one or more wireless communication devices based on path loss information between each antenna and the wireless tag.

13. The method defined in claim 1, wherein controlling the RF energy is performed further by varying the power spectral density (PSD) of the transmitted signal.

14. A system to control energy that is available for powering wireless tags, the system comprising:
   a memory; and
   a processor coupled to the memory and operable to:
      determine to increase radio-frequency (RF) energy available to power a wireless tag, and
      control the RF energy delivered to the wireless tag to provide tag energy by:
         increasing a duty cycle associated with wireless transmissions of one or more wireless communication devices by increasing network traffic of the one or more wireless communication devices.

15. The system defined in claim 14 wherein the processor controls the RF energy further by decreasing path loss of the power to the wireless tag.

16. The system defined in claim 14 wherein the processor controls the RF energy to maximize average power over time1 T at the wireless tag according to:

$$P_{Average\ RX\ Tag} = \frac{1}{T} \sum_{1 \leq j \leq M} T_j \left[ \sum_{1 \leq i \leq N} \frac{P_{peak\ TX}(i, j) K_{duty\ cycle}(i, j)}{K_{path\ loss}(i, j)} \right]$$

where time is $T = \Sigma_{1 \leq j \leq M} T_j$, and (i,j)-dependent components are for a particular configuration of a participating RF-emitting device i at time interval $T_j$.

17. The system defined in claim 14 wherein the processor controls the RF energy further by increasing transmitted power by one or more of (i) increasing transmission RF power of one or more wireless devices or (ii) signaling the one or more wireless communication devices to increase its transmit power.

18. The system defined in claim 14 wherein the processor increases the duty cycle further by increasing frequency of beacon, Probe, or other periodic pulse/packet output for at least one of the one or more wireless communication devices.

19. The system defined in claim 14 wherein the memory stores a data structure that includes capabilities for a plurality of wireless communication devices and their respective path loss with respect to providing energy to the wireless tag, and the processor is operable to access the data structure in response to determining to increase the RF energy available to power the wireless tag to determine which available wireless communication device to control to increase the RF energy delivered to the wireless tag.

20. A computer-readable, non-transitory storage medium having stored thereon a computer program which is executable by a computer, the computer program controlling the computer to execute functions of determining to increase radio-frequency (RF) energy available to power a wireless tag; and controlling the RF energy delivered to the wireless tag to provide tag energy by:

increasing a duty cycle associated with wireless transmissions of one or more wireless communication devices by increasing network traffic of the one or more wireless communication devices.

* * * * *